US012314044B2

(12) United States Patent
Kameshiro et al.

(10) Patent No.: US 12,314,044 B2
(45) Date of Patent: May 27, 2025

(54) GENERATING SEQUENCE OF VEHICLES IN A VEHICLE PRODUCTION FACILITY

(71) Applicant: Hitachi, Ltd., Tokyo (JP)

(72) Inventors: Norifumi Kameshiro, Tokyo (JP); Takuya Okuyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 622 days.

(21) Appl. No.: 17/635,730

(22) PCT Filed: Mar. 26, 2020

(86) PCT No.: PCT/JP2020/013653
§ 371 (c)(1),
(2) Date: Feb. 16, 2022

(87) PCT Pub. No.: WO2021/192140
PCT Pub. Date: Sep. 30, 2021

(65) Prior Publication Data
US 2022/0283570 A1 Sep. 8, 2022

(51) Int. Cl.
*G05B 19/418* (2006.01)
(52) U.S. Cl.
CPC ... *G05B 19/4188* (2013.01); *G05B 19/41845* (2013.01); *G05B 19/41865* (2013.01); *G05B 19/41885* (2013.01)
(58) Field of Classification Search
None
See application file for complete search history.

(56) References Cited

U.S. PATENT DOCUMENTS

| 6,141,598 A * | 10/2000 | Nam | B23P 21/004 700/95 |
| 8,271,921 B2 * | 9/2012 | Nitta | G06F 30/30 716/110 |
| 2016/0065210 A1 | 3/2016 | Yoshimura et al. | |

(Continued)

FOREIGN PATENT DOCUMENTS

| JP | 04-75835 A | 3/1992 |
| JP | 2008-198129 A | 8/2008 |
| JP | 2010-244200 A | 10/2010 |

(Continued)

OTHER PUBLICATIONS

International Search Report of PCT/JP2020/013653 dated Jun. 30, 2020.

*Primary Examiner* — Ariel Mercado-Vargas
(74) *Attorney, Agent, or Firm* — MATTINGLY & MALUR, PC

(57) ABSTRACT

Computation is made of a production plan and sequence satisfying constraint conditions using an interaction model. A system includes a storage device to store management information about specifications on each of a plurality of things to be produced and a computational device to compute a planned sequence of things to be produced in a production process to produce the plurality of things using an interaction model, based on the management information. In this system, the computational device computes an interaction model in which an assignment event of a sequential position in a production process to each of the things is assumed as a variable and a constraint condition regarding the production process is set as strength of an interaction between variables.

9 Claims, 17 Drawing Sheets

(56) References Cited

U.S. PATENT DOCUMENTS

2016/0252898 A1* 9/2016 Sahadeo ............ G05B 19/4183
    700/116
2022/0335323 A1* 10/2022 Takano ................. G06Q 10/04

FOREIGN PATENT DOCUMENTS

| JP | 2016-051314 A | 4/2016 |
| JP | 2020-42687 A | 3/2020 |
| WO | 2005/093649 A1 | 10/2005 |
| WO | 2012/118064 A1 | 9/2012 |

* cited by examiner

| ORDER NUMBER | OPTION 1 | OPTION 2 | ..... | |
|---|---|---|---|---|
| XX1 | 0 | 1 | ..... | |

| ID  | C1 | C2 | ..... | |
|-----|----|----|-------|--|
| XX1 | 0  | 1  | ..... | |
| XX2 | 0  | 0  | ..... | |
| XX3 | 1  | 1  | ..... | |
| XX4 | 1  | 0  | ..... | |
| XX5 | 0  | 1  | ..... | |

| Seq. | ID  | C1 | C2 | ..... |   |
|------|-----|----|----|-------|---|
| 001  | B02 | 1  | 0  | ..... |   |
| ⋮    | ⋮   | ⋮  | ⋮  | ..... |   |
| ⋮    | ⋮   | ⋮  | ⋮  | ..... |   |
| 499  | YE8 | 1  | 1  | ..... |   |
| 500  | YK4 | 0  | 0  | ..... |   |

| LOT INPUT CONDITION ID | INPUT CONDITION CONTENTS |
|---|---|
| P001 | C005, C023 ··· |
| P002 | C009, C113 ··· |
| P003 | C007, C122 ··· |
|  |  |

602

| CONSTRAINT CONDITION ID | INPUT CONDITION CONTENTS |
|---|---|
| C001 | MATHEMATICAL EXPRESSION (1) |
| C002 | MATHEMATICAL EXPRESSION (2) |
| C003 | MATHEMATICAL EXPRESSION (3) |
|  |  |

Fig. 10

| Seq./ID | YE8 | YK4 | XX1 | XX2 | XX3 | XX4 | XX5 | .. |
|---|---|---|---|---|---|---|---|---|
| 499 | 1 | 0 | 0 | 0 | 0 | 0 | 0 | |
| 500 | 0 | 1 | 0 | 0 | 0 | 0 | 0 | |
| 501 | 0 | 0 | 1 | 0 | 0 | 0 | 0 | |
| 502 | 0 | 0 | 0 | 1 | 0 | 0 | 0 | |
| 503 | 0 | 0 | 0 | 0 | 1 | 0 | 0 | |
| 504 | 0 | 0 | 0 | 0 | 0 | 1 | 0 | |
| ⋮ | | | | | | | | |

C1 values: YE8=1, YK4=0, XX1=0, XX2=0, XX3=1, XX4=1, XX5=0

C2 values: YE8=1, YK4=0, XX1=1, XX2=0, XX3=1, XX4=0, XX5=1

| Seq. | ID | C1 | C2 | ..... | |
|---|---|---|---|---|---|
| 001 | B02 | 1 | 0 | ..... | |
| ⋮ | ⋮ | ⋮ | ⋮ | ..... | |
| 499 | YE8 | 1 | 1 | ..... | |
| 500 | YK4 | 0 | 0 | ..... | |
| 501 | XX1 | 0 | 1 | ..... | |
| 502 | XX4 | 1 | 0 | ..... | |
| ⋮ | ⋮ | ⋮ | ⋮ | ..... | |
| 999 | KM8 | 1 | 1 | ..... | |
| 1000 | HJ4 | 0 | 0 | ..... | |

| SENSED INFORMATION | CONDITION CHANGE PLAN |
|---|---|
| ABSENCE OF ONE WORKER FOR AIR-CONDITIONER | CONSTRAINT CONDITION C001 NUMBER OF LOTS 3 ⇒ 4 |
| ABSENCE OF TWO WORKERS FOR AIR-CONDITIONER | CONSTRAINT CONDITION C001 NUMBER OF LOTS 3 ⇒ 5 |
| FREQUENCY OF BELT CONVEYOR STOP ONCE/HOUR | CONSTRAINT CONDITION C001 NUMBER OF LOTS 3 ⇒ 4 CONSTRAINT CONDITION C002 NUMBER OF LOTS 2 ⇒ 3 |
| ⋮ | |

GENERATING SEQUENCE OF VEHICLES IN A VEHICLE PRODUCTION FACILITY

TECHNICAL FIELD

The present invention relates to a technology that supports more efficient production and particularly concerns a technology that solves an optimization problem using an interaction model and proposes a production plan.

BACKGROUND ART

A so-called combinatorial optimization problem for searching for a solution that maximizes or minimizes a desired parameter under a predetermined condition can be applied to a complex problem in real society. A commonly used method for solving a combinatorial optimization problem is computation using a Von Neumann architecture computer that is a mainstream at the present time. Basic operation of the Von Neumann architecture computer resides in sequential execution of a string of instructions. However, along with limits of operating clock frequency, there are restrictions in terms of scale of a soluble problem and processing speed on an optimization problem producing a huge amount of solution candidates.

On the other hand, one method of solving a large-scale combinatorial optimization problem heuristically may be made to correspond to a ground state search on an interaction model for explaining behavior of magnetic elements. Some technical approaches are proposed that allow for reaching a ground state at high speed by implementing, particularly, an Ising model which is one of interaction models in dedicated hardware and applying the principle of simulated annealing or quantum annealing.

Examples of technical approaches by which it is possible to solve an optimization problem are found in Patent Literatures 1 to 3. PTL 1 describes an application example of a configuration in which a semiconductor device with components serving as basic constituent units being arranged in an array is used to simulate and represent states of quantum spins in order to seek for a ground state of an Ising model. PTL 2 provides description about quantum computing using superconducting circuits. PTL 3 describes implementing the magnitude and sign of simulated Ising interaction between two slave lasers by controlling the intensity, polarization, and phase of light that is exchanged between the two slave lasers using an attenuator and a wave plate.

On the other hand, for example, PTL 4 discloses a technical approach as below: when a plurality of vehicle types are produced in the same line, should it happen that a vehicle has become unable to conform to a production plan and sequence planned in advance, the technical approach enables re-planning of a production plan and sequence taking account of a delayed vehicle.

CITATION LIST

Patent Literature

PTL 1: Japanese Patent Application Laid-Open No. 2016-051314
PTL 2: WO2005/093649A1
PTL 3: WO2012/118064A1
PTL 4: Japanese Patent Application Laid-Open No. 2010-244200

SUMMARY OF INVENTION

Technical Problem

In some cases, multi-product mixed production in which vehicles of multiple types or multiple specifications are produced in one line may be performed in a production line of motor vehicles. For example, when vehicles of different types are manufactured in one line, the working load of workers differs depending on the vehicle type. Also, even in a production line of vehicles of the same type, body colors of vehicles to be painted or specifications of options such as a car navigation system and an air-conditioner may differ with respect to each vehicle. Hence, for such multi-product mixed production, it is needed to make a suitable production plan for carrying out efficient production.

A technical approach for making a production plan and sequence is found in PTL 4 mentioned above. Nevertheless, a method of heuristically solving a production plan and sequence satisfying constraint conditions using an interaction model has not been known.

Therefore, computing a production plan and sequence satisfying constraint conditions using an interaction model is required.

Solution to Problem

One preferred aspect of the present invention is a system including a storage device to store management information about specifications on each of a plurality of things to be produced and a computational device to compute a planned sequence of things to be produced in a production process to produce the plurality of things using an interaction model, based on the management information. In this system, the computational device computes an interaction model in which an assignment event of a sequential position in a production process to each of the plurality of things is assumed as a variable and a constraint condition regarding the production process is set as strength of an interaction between variables.

In a more concrete example, at least a subset of the plurality of things differs in specifications and is produced by different production processes and, as a constraint condition regarding the production process, the strength of an interaction between variables differs depending on at least an interval of the same production processes.

Another preferred aspect of the present invention is an information processing method using an information processing system including an administrative device and a computational device, the administrative device inputting an interaction model to the computational device and causing the computational device to execute computation. This method performs: a first step in which the administrative device acquires a received order list including received order data about specifications on each of a plurality of things to be produced; a second step in which the administrative device acquires constraint conditions regarding production processes required to meet the specifications on each of a plurality of things to be produced; a third step in which the administrative device generates an interaction model based on the received order list and the constraint conditions; a fourth step in which the administrative device inputs the interaction model to the computational device; a fifth step in which the computational device executes a ground state search on the interaction model; a sixth step in which the administrative device reads a result of computation executed by the computational device; and a seventh step in which the administrative device generates a sequence list prescribing assignment events of sequential positions in the production processes to each of the plurality of things, based on the result of computation.

In a more concrete example, in the second step, the constraint conditions each prescribe at least one of frequency of occurrence and a pattern of occurrence of the production processes.

In another more concrete example, in the third step, the interaction model is a model in which an assignment event of a sequential position in a production process to each of the plurality of things is assumed as a variable and a constraint condition regarding the production process is set as strength of an interaction between variables.

Advantageous Effects of Invention

It is possible to compute a production plan and sequence satisfying constraint conditions using an interaction model.

BRIEF DESCRIPTION OF DRAWINGS

FIG. 2 is a table chart exemplifying received order data 201.

FIG. 4 is a table chart exemplifying received order list 120.

FIG. 5 is a table chart exemplifying a sequence list 130.

FIG. 6 is a table chart exemplifying production condition data 140.

FIG. 10 is a table chart that conceptually represents a generated problem.

FIG. 11 is a table chart exemplifying a sequence list 130 including an additional part.

FIG. 16 is a table chart exemplifying a condition change table 1600.

DESCRIPTION OF EMBODIMENTS

Figure 1:
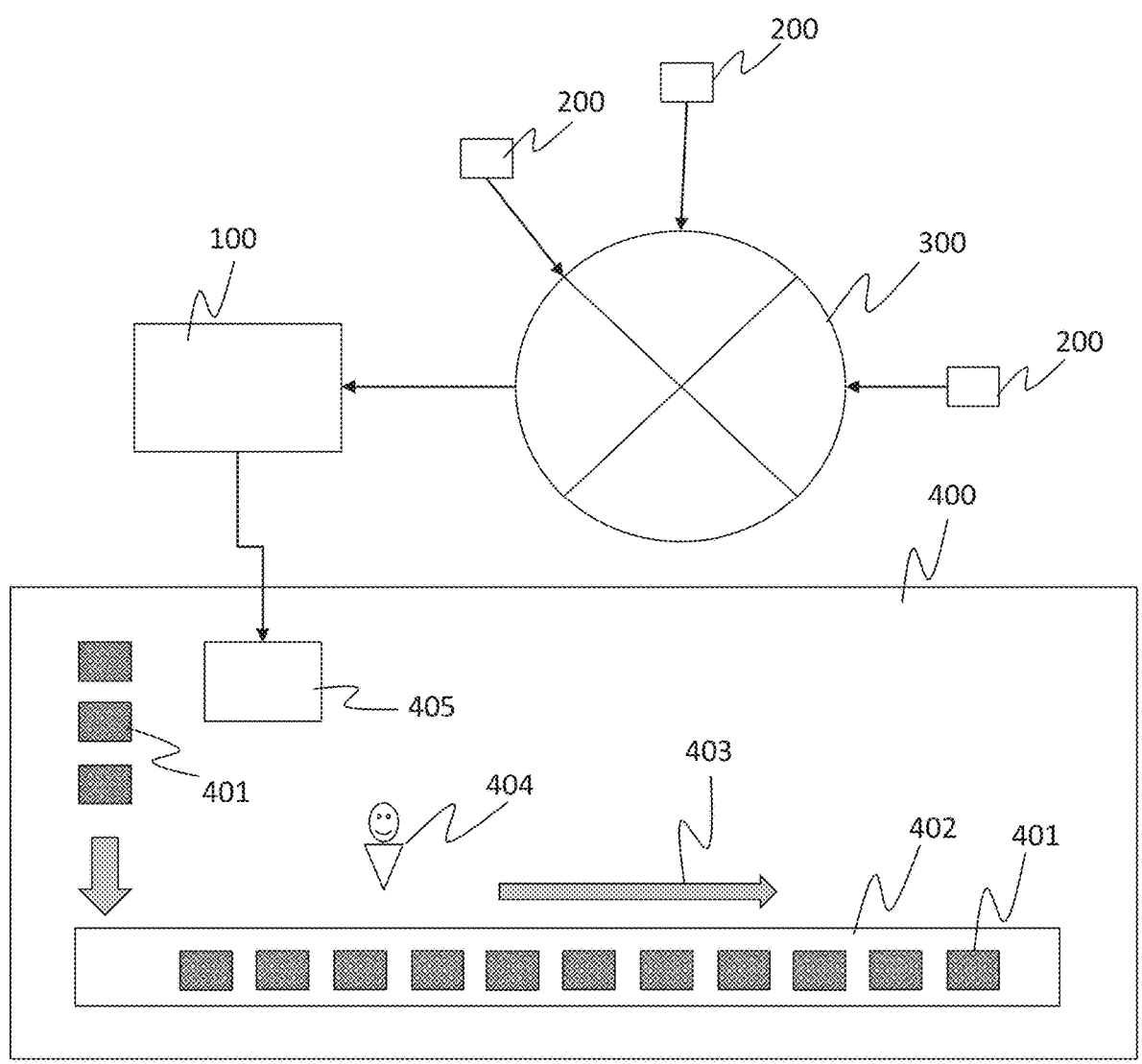
FIG. 1 is a block diagram depicting an example of operation of a production plan proposal system.

In the following, embodiments of the present invention will be described with reference to the drawings. Each of the embodiments set forth herein is one example for implementing the present invention and is not intended to limit the technical scope of the present invention. Note that members having the same function in examples are assigned the same reference numeral and repetitive description thereof is omitted unless otherwise required. Also, parts of prior art not directly related to the present invention are omitted.

Multiple elements having an identical or similar function, if they exist, may be assigned the same reference numeral with different subscripts in describing them. However, when it is not necessary to individualize those multiple elements, the subscripts may be omitted in describing them.

Notation of "first", "second", "third", etc. in the present specification and other related documents is prefixed to identify components, but it is not necessarily intended to confine the components to a certain number, sequence, or contents. In addition, numbers to identify components are used on a per-context basis; a number used in one context does not always denote the same component in another context. Further, it is not precluded that a component identified by a number also functions as a component identified by another number.

In some cases, the position, size, shape, range, etc. of each component depicted in a drawing or the like may not represent its actual position, size, shape, range, etc. with the intention to facilitate understanding of the invention. Hence, the present invention is not necessarily to be limited to a certain position, size, shape, range, etc. disclosed in a drawing or the like.

Publications, patents, and patent applications cited in the present specification are incorporated intact in the description herein.

Singular form mention of components in the present specification should be construed to include plural forms, unless otherwise specified in context.

Example 1

<1. Example of Operation of Production Plan Proposal System>

FIG. 1 is a block diagram depicting an example of operation of a production plan proposal system. In describing the present example, the following description takes production of motor vehicles as an example; however, of course, the present example is also applicable to production of other products.

A production plan proposal system 100 in FIG. 1 is a system that proposes a production plan. The configuration and operation of the production plan proposal system 100 will be detailed later.

Dealer terminals 200 are computer terminals, for example, located at the stores of motor vehicle dealers. The computer terminals may be personal computers in common use. When a motor vehicle dealer receives an order of a motor vehicle from a customer, the dealer makes an arrangement to install an option into the motor vehicle according to the customer's demand. Received order data that represents what option is to be installed is input from a dealer terminal 200 and collected by the production plan proposal system 100 via a network 300 using, e.g., the Internet or a discrete network.

Figure 2:
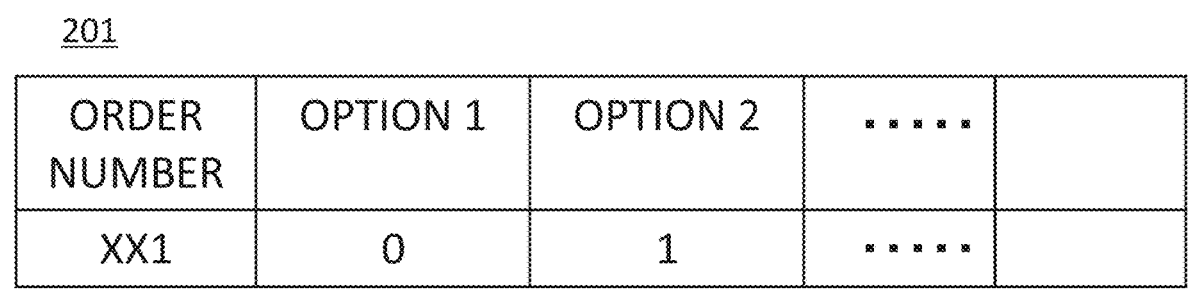

FIG. 2 is a table chart exemplifying the received order data 201. In relation to an "order number" that uniquely identifies an order received, symbols "option 1", "option 2", etc. that uniquely identify option types are digitized; "1" and "0" indicate presence and absence of the option.

A production line 400 in FIG. 1 is a facility where various options are installed into motor vehicles of order received. In the production line 400, for example, motor vehicles 410 are mounted on a belt conveyor 402 and move in a direction of an arrow 403 and a work of installing various options to the moving motor vehicles are performed by workers 404.

In the production line 400, it is desirable that a sequence to input motor vehicles to be produced (such things to be produced are to be referred to as lots for convenience) complies with a predetermined constraint condition in view of production efficiency.

For example, when different options are installed for each lot, working time of the workers 404 differs per option. It is assumed that it takes one hour for one motor vehicle 401 to pass a work area, carried by the belt conveyor 402 of the production line 400. It is also assumed that it requires 30 minutes to install an air-conditioner which is one option, it requires 20 minutes to install a car navigation system which is another option, and the works of installing both can be performed in parallel in the work area. Because the time for which one motor vehicle stays in the work area is one hour, to complete installation of the options in this work area, a plan should be made as below: two lots into which the air-conditioner is installed will pass the area per hour and three lots into which the car navigation system is installed will pass the area per hour. Here, for example, if the capacity of the work area is six lots, the sequence to input lots should be determined so that a lot into which the air-conditioner is installed will occur as one lot per three lots and a lot into which the car navigation system is installed will occur as one lot per two lots.

Supposing that there is, e.g., a constraint of dealing with one lot per two lots with respect to an option, a constraint term expressing this constraint condition is represented as in Mathematical Expression (1).

[Mathematical Expression 1]

If $p_i = p_{i+1}$ (1)

$$\sum_i \{(x_i + x_{i+1}) - 1\}^2$$

Here, $p_i$ is an option number denoting an option type for an i-th lot, where i is order of lots and x is a variable indicating whether to deal with the lot. "1," indicates to deal with the lot and "0" indicates not to deal with the lot. This constraint term assumes a value of 0 while a succession of alternate "1s" and "0s" occurs, but turns to 1 when a succession of "1s" or "0s" occurs and penalty increases.

In addition, in a case where color painting of the body of a motor vehicle is performed, continuous painting with the same color makes work efficiency better. However, after the continuous painting with a color is done for a predetermined number of lots, the painting with the color has to be stopped once for paint replenishment and equipment maintenance. Hence, as regards painting, lots to be painted with the same color as continuously as possible up to the limit that is set to, e.g., a maximum of k lots should be input.

A constraint condition to retain a continuity of painting with the same color is represented as in Mathematical Expression (2).

[Mathematical Expression 2]

If $C_i \neq C_{i+1}$ (2)

$$\sum_i x_i \cdot x_{i+1}$$

Here, $C_i$ is a color number denoting a color type with which an i-th lot is painted. Continuation of different color numbers increases a value of Mathematical Expression (2) which is a constraint term and penalty increases.

Also, a constraint not to retain a continuity of painting with the same color more than a maximum of k lots is, for example, represented as in Mathematical Expression (3).

[Mathematical Expression 3]

If $C_i = C_{i+1}$ (3)

$$\left(\sum_i x_i \cdot x_{i+1} - y_i\right)^2$$

In Mathematical Expression (3), y is a variable that assumes a desired value from 0 to k. Hence, this constraint term means that continuation of painting with the same color more than k increases penalty.

The production plan proposal system 100 is a system that proposes an appropriate sequence of dealing with lots taking constraints like those noted above into account. A production plan proposed by the production plan proposal system 100 is displayed on an output device of a production line terminal 405, e.g., on an image monitor. The production line terminal 405 is an information processing device capable of displaying or outputting data from the production plan proposal system 100; for example, a personal computer in common use can be used therefor.

A production plan prescribes a sequence to deal with lots in the production line 400. In particular, this sequence is, for example, a sequence to mount motor vehicles 401 on the belt conveyor 402. The workers 404 in the production line perform a work of mounting motor vehicles 401 on the belt conveyor 402 according to the displayed production plan. The work may be automated with publicly known robots or the like instead of working persons <2. Configuration of Production Plan Proposal System>

Figure 3:
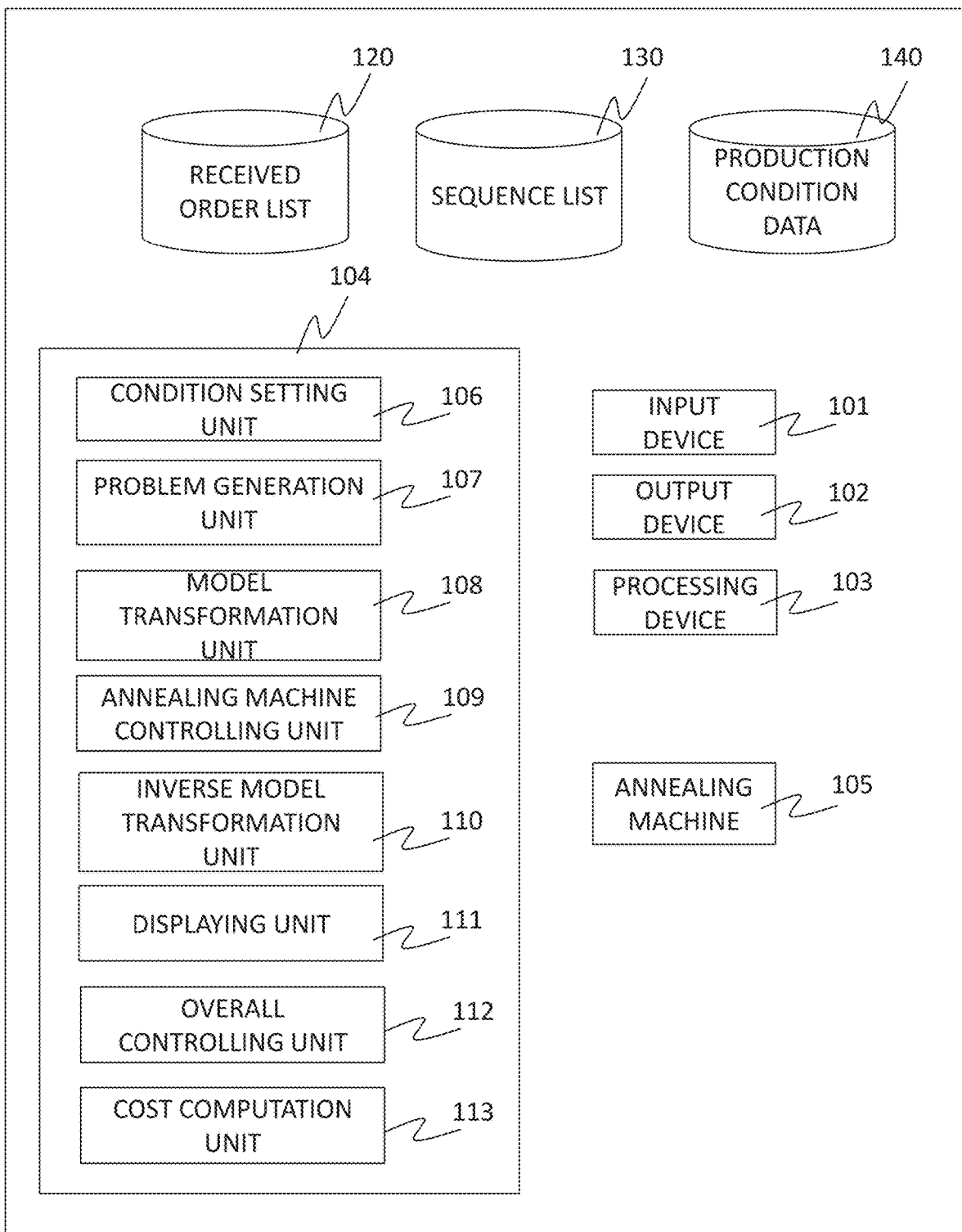
FIG. 3 is a block diagram depicting a configuration of the production plan proposal system 100.

FIG. 3 is a block diagram depicting a configuration of the production plan proposal system 100. Basically, the production plan proposal system 100 can use a configuration like a publicly known server and includes components as those of a commonly used server, such as an input device 101, an output device 102, a processing device 103, and a storage device 104. These components are interconnected through an internal bus which is not depicted and information and instructions can be transmitted and received among them. The input device 101 may have publicly known components such as a keyboard, a mouse, and an interface for receiving information from a network. The output device 102 may have publicly known components such as an image monitor, a printer, and an interface for transmitting information onto a network. The storage device 104 may be an optional combination of a plurality of types of storage devices such as a magnetic disk and a semiconductor memory.

Software is installed in the storage device 104, including a condition setting unit 106, a problem generation unit 107, a model transformation unit 108, an annealing machine controlling unit 109, an inverse model transformation unit 110, a displaying unit 111, an overall controlling unit 112, and a cost computation unit 113. In a case where some or all of these functions are implemented by software, the functions of computation, control, and others are implemented in such a way that programs stored in the storage device 104 are executed by the processing device 103 to perform a defined process in cooperation with other hardware. Programs that a computer or the like executes, their functions, or means that implement the functions may be referred to as "functions", "means", "sections", "tools", "units", "modules", etc. Functions equivalent to the functions configured by software in the present example can also be implemented by hardware such as FPGA (Field-Programmable Gate Array) and ASIC (Application Specific Integrated Circuit). Each function of the software will be described later.

An annealing machine 105 is a computational device that is used to solve a specific optimization problem and is assumed to be a piece of hardware in the present example. A publicly known configuration as described in PTLs 1 to 3 can be used for the annealing machine 105. In the present example, the annealing machine 105 is described on the assumption that it is implemented as a COMS (Complementary Metal-Oxide Semiconductor) integrated circuit device or a logic circuit device on FPGA (Field Programmable Gate Array); however, it can also be implemented as a device of any other type, provided that the device is capable of solving an optimization problem replaced by an interaction model.

In particular, annealing may be implemented with superconducting circuits or the like as well as hardware in which annealing is implemented with electronic circuits (digital circuits). In addition, the implementation may be with hardware that implements an Ising model other than annealing. For example, a laser network method (optical parametric oscillation), a quantum neural network, etc. are known. In addition, although with some conceptual difference, a quantum gate method in which computation that is executed by an Ising model is replaced by computation with gates such as Hadamard gates, rotating gates, and control NOT gates can also be adopted for the annealing machine in the present example.

The annealing machine 105 in FIG. 3 is a piece of hardware dedicated to perform a ground state search on an interaction model. In a case where the annealing machine is configured as a COMS integrated circuit device, it may have an expansion card form that is attached to a host including the processing device 103 and the storage device 104 like a GPU (Graphics Processing Unit) which is a piece of hardware dedicated for, e.g., a screen drawing process. Although the annealing machine 105 is placed within the production plan proposal system 100 in FIG. 3, it may be placed outside the production plan proposal system 100. In the configuration of FIG. 3, as for an arrangement of the annealing machine other than described in the present example, a citation can be made to an arrangement, for example, described in PTL 1.

The production plan proposal system 100 of FIG. 3 is configured such that, as an example, the input device 101, the output device 102, the processing device 103, and the storage device 104 are those of a Von Neumann computer that controls the annealing machine, as an information processing device (an administrative device) that administers the annealing machine 105.

The production plan proposal system 100 can get access to data in a received order list 120 and a sequence list 130 and production condition data 140. These lists may be stored beforehand in the storage device 104 or access may be made to data stored on any other information processing device outside the production plan proposal system 100 via the network 300 or the like.

The received order list 120 is an aggregation of received order data 201 collected from respective dealer terminals 200. The received order data 201 may be collected in real time or at any given time through the input device 101 by a publicly known method. The received order data 201 may be collected via the network 300 that is wired or wireless or may be input each time from the input device. Alternatively, the received order data 201 recorded in a portable recording medium may be read in from the input device 101.

Figure 4:
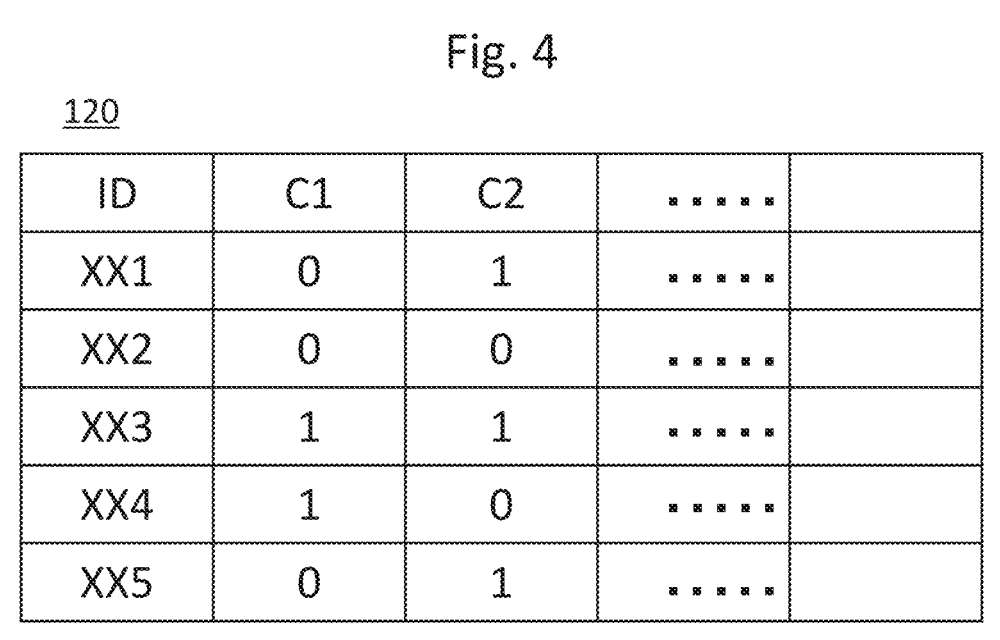

FIG. 4 is a table chart exemplifying the received order list 120. "ID" is an identifier that uniquely identifies a lot and one to one corresponds to, e.g., an "order number" in the received order data 201 of FIG. 2. "C1", "C2", etc. are parameters indicating presence or absence of a work and one to one correspond to, e.g., "option 1", "option 2", etc. in the received order data 201. For example, by "1" or "0", C1 indicates presence or absence of the work of installing an air-conditioner and C2 indicates presence or absence of the work of installing a car navigation system. It is assumed that "1" denotes presence of the work to do now and "0" denotes absence of the work.

The sequence list 130 is data indicating a sequence of inputting lots to the production line as determined by the production plan proposal system 100.

FIG. 5 is a table chart exemplifying the sequence list 130. The sequence list 130 indicates a determined sequence of inputting lots. "Seq." denotes a sequence of inputting lots to the line by a serial number. Other headers are the same as those of the received order list 120.

The production condition data 140 is data in which conditions that are required when inputting lots to the production line have been stored. The production condition data 140 is input by an operator from the input device 101 and is to be recorded beforehand as a database.

FIG. 6 is a table chart exemplifying the production condition data 140. The production condition data 140 includes lot input condition data 601 and constraint condition data 602. A piece of lot input condition data 601 is at least one piece of constraint condition data 602 or a set of multiple pieces of constraint condition data 602. A piece of constraint condition data 602 is an individual condition required when inputting a predetermined lot to the production line. A piece of lot input condition data 601 includes an "input condition ID" that uniquely identifies a lot input condition and "input condition contents" indicating a set of constraint conditions constituting the lot input condition. A piece of constraint condition data 602 includes a "constraint condition ID" that uniquely identifies a constraint condition and "constraint condition contents" of the constraint condition. The "constraint condition contents" of a constraint condition represent a frequency or a pattern of occurrence of a work according to, e.g., the specifications of lots. A frequency of occurrence of a work is like a condition, e.g., "to deal with one lot per two lots". A pattern of occurrence of a work is like a condition, e.g., "to deal with lots continuously up to a maximum of 10 lots". When represented in mathematical expressions, these conditions are represented as in Mathematical Expressions (1) to (3); however, a form of representation is optional.

<3. Process by Production Plan Proposal System>

Figure 7:
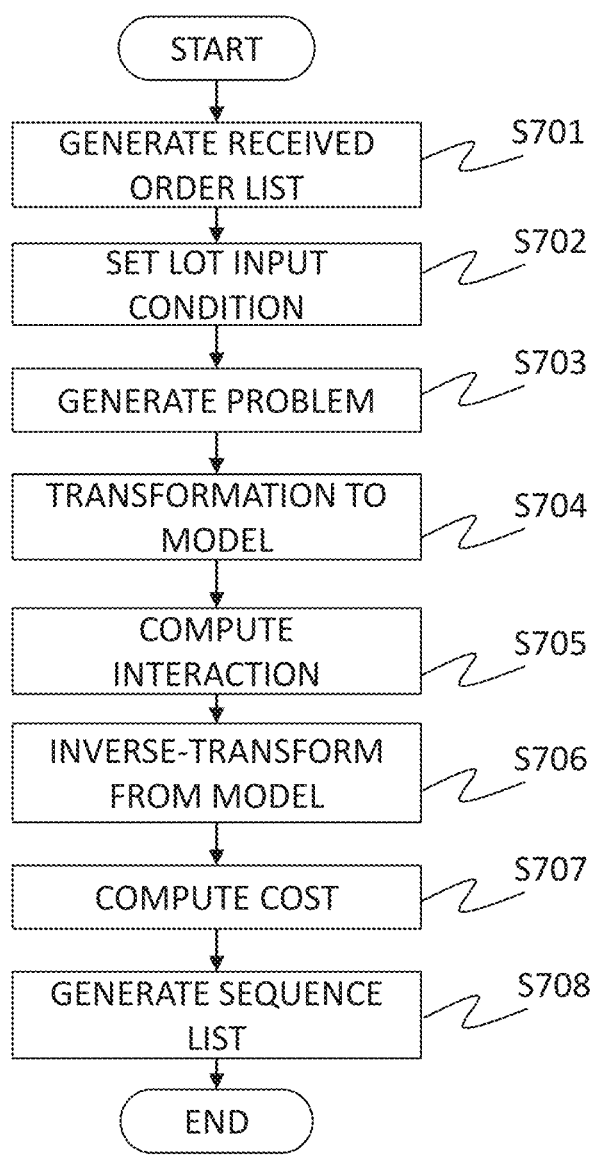
FIG. 7 is a flowchart illustrating a process by the production plan proposal system 100.

FIG. 7 is a flowchart illustrating a process by the production plan proposal system 100. In the present example, all steps of the process are to be performed in such a way that the processing device 103 of the production plan proposal system 100 reads and executes an applicable one of the programs. To avoid complexity of description, the flowchart is explained below on the assumption that the subject of action is each program.

Step S701 is a processing step of generating a received order list 120 by the overall controlling unit 112. This process generates the list in real time or in a batch by a publicly known method, as described previously.

Step S702 is to set a lot input condition. If predetermined lot input conditions are stored beforehand in the lot input condition data 601 in the production condition data 140, the condition setting unit 106 invokes a desired lot input condition. If a new lot input condition is applied, an operator is prompted to input such condition from the input device 101. Steps 701 and S702 may be executed in optional order.

Here, a lot input condition is assumed to refer to a set of one or more constraint conditions. Constraint conditions when inputting lots to the production line are, for example, as follows:

Constraint condition example 1: to deal with m lots of successive n lots

Constraint condition example 2: to deal with lots continuously up to a maximum of k lots These conditions can be represented, for example, as in mathematical expressions (1) to (3) of constraint terms.

Figure 8:
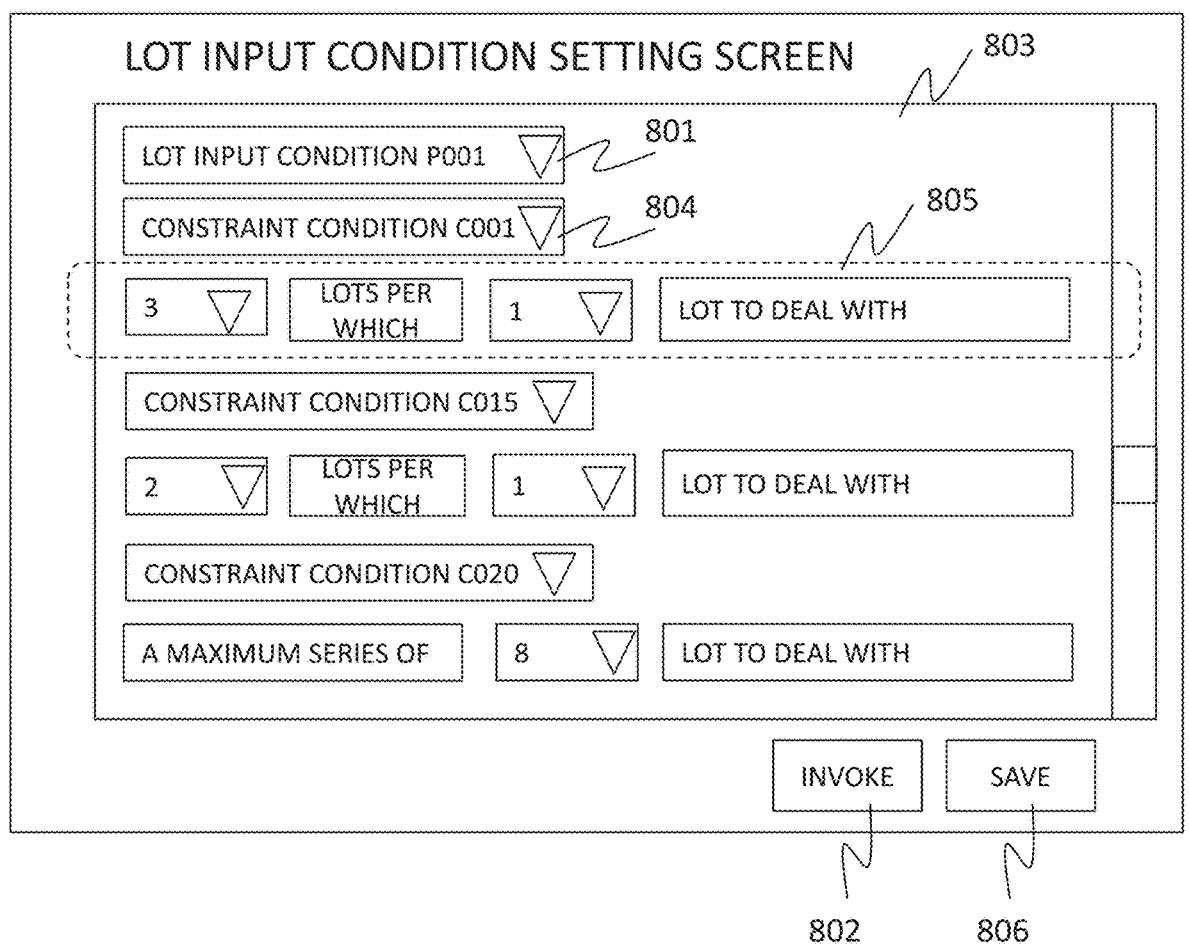
FIG. 8 is an illustrative diagram depicting an example of GUI of a lot input condition setting screen.

FIG. 8 is an example of GUI (Graphical User Interface) of a lot input condition setting screen which the displaying unit 111 displays on the image monitor which is the output device 102 in order to acquire data to be input to the condition setting unit 106. The operator can add or edit a constraint condition using the GUI. Also, the operator can set a lot input condition by combining constraint conditions.

If predetermined lot input conditions are stored beforehand in the production condition data 140, the operator can specify a file name and a lot input condition ID from a pull-down menu 801 for specifying a file and invoke the lot input condition with an invoke button 802. The invoked condition can be edited on the edit screen 803. It is expedient to stylize the GUI according to the type of work so that the operator can perform input such as edit intuitively. For example, when the operator specifies a constraint condition using a pull-down menu 804 for constraint conditions, a menu for input presenting a pattern associated with the constraint condition is displayed as is given in a dotted box 805.

In the dotted box 805, for example, as a constraint condition C001, what is presented is dealing with lots at a ratio of one lot per three lots with regard to lots for which an air-conditioner is designated as an option. Although not depicted in FIG. 8, it may be displayed that lots to which the constraint condition C001 applies are those with an option of "air-conditioner". As a constraint condition C015, for example, what is presented is dealing with lots at a ratio of one lot per two lots with regard to lots for which a car navigation system is designated as an option. As a constraint condition C020, for example, what is presented is painting lots with the same color continuously up to a maximum of eight lots. While each constraint condition corresponds to one condition in the example of FIG. 8, multiple conditions may be combined with AND and OR unless they contradict each other.

The operator can edit constraint conditions in the edit screen 803. Also, the operator can edit an existing lot input condition or create a new lot input condition. Upon completion of an operation, the condition will be stored into the production condition data 140 with a save button 806.

Step S703 is to set a problem. A problem is generated from the received order list 120 generated at step S701, at least a subset of the recorded sequence list 130, and the lot input condition data 601 set at step S702.

Figure 9:
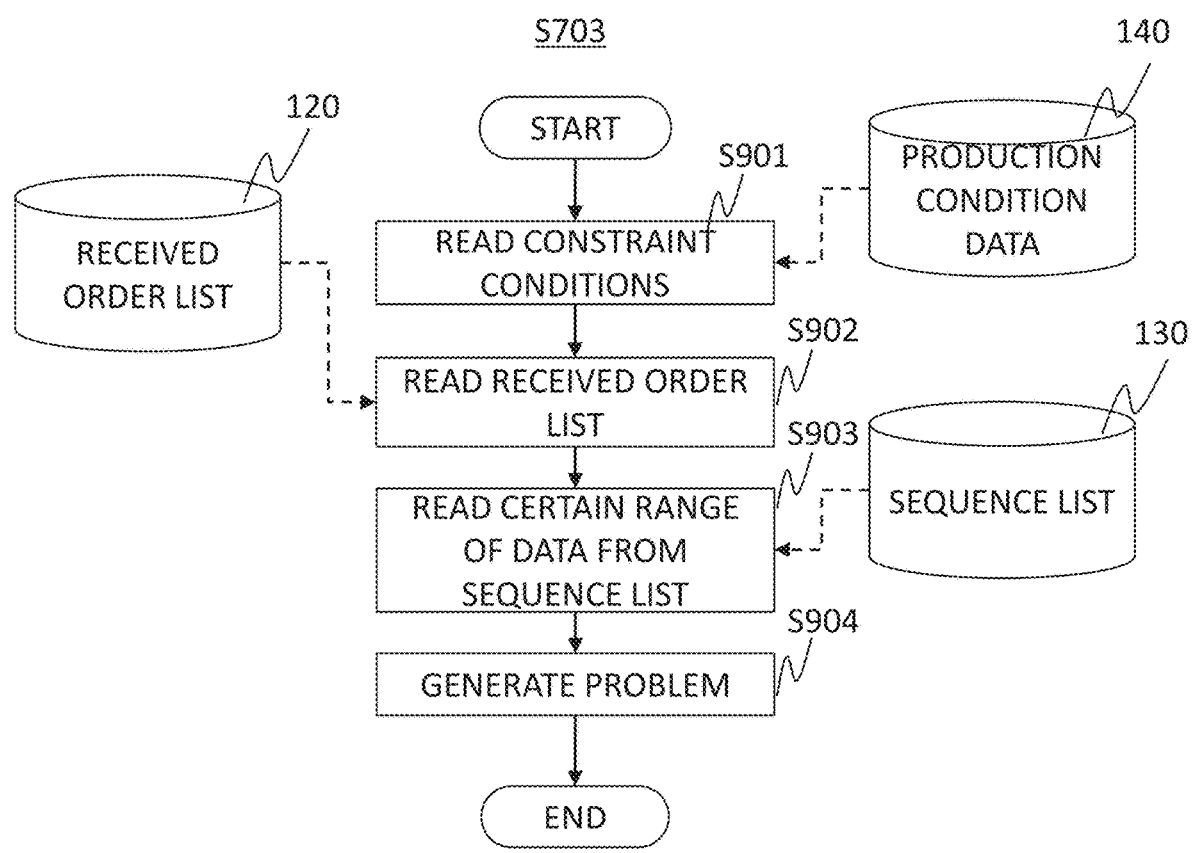
FIG. 9 is a flowchart illustrating detail of a problem setting step S703.

FIG. 9 is a flowchart illustrating detail of the problem setting step S703. The problem generation unit 107 reads out the received order list 120, at least a subset of the sequence list 130 and the lot input condition data 601 in the production condition data 140 at steps S901 to S903. These lists and data may be read out in optional order.

At step S904, the problem generation unit 107 generates a problem based on the received order list 120, at least a subset of the sequence list 130 and the lot input condition data 601. An objective function for which a minimum value is searched for by the annealing machine is generally obtained by adding constraint terms and can be represented as below.

$$\text{Objective function} = w_1 \text{ (constraint term 1)} + w_2 \text{ (constraint term 2)} + \ldots$$

The objective function is prescribed by the lot input condition data 601 set at step S702 and each constraint term is represented in the form of mathematical expression, e.g., as exemplified previously in Mathematical expressions (1) to (3).

Here, $w_1$ and $w_2$ are weight constants which serve as a factor to determine what term should be minimized with priority. For example, if all constraint terms are evenly minimized, the weight constants are set to be equal. On the other hand, if a problem setup is such that "a constraint condition of the second term should be complied with strictly, whereas a constraint condition of the third term is regarded as less important", a weight constant which is the coefficient of the term regarded as important should be set to a larger value so that a desired solution can be obtained. The weight constants are determined beforehand and stored in the problem generation unit 107. Alternatively, the operator may specify values of the weight constants each time. By searching for a solution that minimizes the value of the objective function, a lot input sequence that satisfies the constraints as much as possible can be obtained.

At least a subset of the sequence list 130 is used to ensure that a lot input sequence that is proposed newly is consistent with determined lot input sequences. How far the sequence list 130 should be scrolled to fetch fixed sequences to be put into an object list depends on constraint conditions. This may be determined by the operator when setting a problem or a quantity of sequences that is regarded as sufficient may be determined in advance. In the latter case, for example, the sequence list is scrolled by No. 100 as a fixed value and the fixed sequences up to "Seq." 400 contained in the sequence list are fetched and put into the object list. Note that, when a production plan is proposed at the first time, i.e., no past data is contained in the sequence list 130, the sequence list 130 does not need to be used.

FIG. 10 is a table chart that conceptually represents a generated problem (data preceding Seq. 498 is omitted from being displayed). A matrix in a lower part of the FIG. 10 is an arrangement of values x of spins and x=1 means what position in "Seq" into which a lot denoted by each ID is placed. A gray portion in FIG. 10 contains determined sequences which are prescribed in the sequence list 130. A white portion in FIG. 10 is yet to be determined from now. In this example, initial data is such that lots are placed into sequences in order of IDs. Nevertheless, initial data for annealing may be random data. In addition, in an upper part of FIG. 10, manufacturing conditions C1, C2 . . . for lots denoted by each ID are given. In this example, the sequences of lots up to No. 500 have already been determined and the sequences of lots of No. 501 and subsequent are going to be determined.

Returning to FIG. 7, at step S704, the model transformation unit 108 transforms the problem to an Ising model. The annealing machine 105 takes inputs of parameters for an Ising model which is a computational model that runs normally within the machine. Therefore, a problem desired to be solved has to be transformed to an Ising model. As is well known, an Ising model is given by Mathematical Expression (4) below.

[Mathematical Expression 4]

$$E = \sum_i h_i \sigma_i + \sum_{i,j} J_{ij} \sigma_i \sigma_j \quad (4)$$

Here, E is an energy function corresponding to the objective function, h and j are coefficients which are determined by constraint conditions, and σi is a value of an i-th spin in the case of Ising model and assumes a value of "+1" or "−1".

The problem is encoded to a format in which the annealing machine can process data; as such format, QUBO: Quadratic Unconstrained Binary Optimization is known. QUBO is represented as in Mathematical Equation (5) below and enables processing equivalent to Ising model.

[Mathematical Expression 5]

$$E = \sum_i b_i x_i + \sum_{i,j} Q_{ij} x_i x_j \quad (5)$$

Here, E is an energy function corresponding to the objective function, b and Q are coefficients which are determined by constraint conditions, and $x_i$ is a value of an i-th spin and assumes a value of "0" or "1". An encoder that transforms the set problem to the QUBO format is already known.

Note that, as can be appreciated from the matrix in the lower part of FIG. 10, as a premise constraint condition, a condition that one "ID" is assigned to one sequence "Seq." is required. This constraint condition is represented as in Mathematical Expression (6) below and is given by default in addition to the conditions set at step S702.

[Mathematical Expression 6]

$$\sum_s \left( \sum_n x_{sn} - 1 \right)^2 \quad (6)$$

AND $$\sum_n \left( \sum_s x_{sn} - 1 \right)^2$$

Here, s denotes a sequence "Seq." and n denotes "ID".

At step S705, under control of the annealing machine controlling unit 109, the annealing machine 105 executes interaction computation and searches for an optimal solution. A ground state search on an Ising model is an optimization problem of seeking an arrangement of spins that minimizes the energy function of the Ising model.

For this purpose, the annealing machine controlling unit 109 sends QUBO data which is given in Mathematical Expression (5) to the annealing machine 105 and the annealing machine executes computation. As for the interaction computation itself, examples of devices and sequences to execute interaction computation are disclosed in, e.g., PTLs 1 to 3 and others and interaction may be computed following such technology. For example, according to the technical approach of PTL 1, elements called spin units applying an SRAM (Static Random Access Memory) technology are arranged in an array. With a memory to store spin values $x_i$ of all the spin units, a memory to store coefficients $b_i$ and $Q_{ij}$, and logic circuits to execute interaction computation, interaction computation is executed in parallel for making transition to a ground state. Spin values $x_i$ that are stored in this process may be binary "0" and "1". Nevertheless, an example in which spin values are expanded to multiple values is also described in PTL 1 and a multi-value method can be adopted also in the present example. In the present example, conceptual aspects of the spins that can assume values including multi-valued variables are to be referred to as "nodes".

Inside the annealing machine 105, a computation is made of an interaction model in which an assignment event of a sequential position in a production process to each lot is assumed as a variable (x in Mathematical Expression (5)) and a constraint condition regarding the production process is set as strength of an interaction between variables (Q and b in Mathematical Expression (5)). Note that events are given as variables in the problem in FIG. 10 in the white portion of the matrix in the lower part of FIG. 10. Events in the gray portion of the matrix are fixed and, therefore, handled as constants (fixed values).

At a point of time when a decision has been made that a system has reached a ground state eventually, or when a predetermined period of time has elapsed, basic solutions are sent from the annealing machine 105 to the annealing machine controlling unit 109.

At step S706, the inverse model transformation unit 110 inversely transforms the solutions in the QUBO format to a data form.

Because solutions that can be obtained through the ground state search by the annealing machine 105 are obtained probabilistically, they include a solution that violates a constraint condition in strict terms. Therefore, evaluation needs to be made through execution of a cost computation based on the number of occurrences of violating a constraint condition.

At step S707, the cost computation unit 113 evaluates the obtained solutions (a plurality of solutions are typically obtained) through execution of, e.g., a computation as below.

Cost function $c_1$ (the number of occurrences of violating the constraint term 1)+$c_2$ (the number of occurrences of violating the constraint term 2)+
. . .

Here, $c_1$ and $c_2$ are weight constants which serve as a factor to determine what term should be prioritized. For example, if all constraint terms are evenly handled, the weight constants are set to be equal. On the other hand, if a problem setup is such that "a constraint condition of the second term should be complied with strictly, whereas a constraint condition of the third term is regarded as less important", a weight constant which is the coefficient of the term regarded as important should be set to a larger value so that a desired solution can be obtained. For example, because violating the constraint condition in Mathematical Expression (6) given previously makes the annealing machine unable to function logically, a larger weight (e.g., $10^{10}$) is given. Since the constraint condition as in Mathematical Expression (2) to retain a continuity of painting with the same color only requires continuation as long as possible, a smaller weight (e.g., 10) is given.

The weight constants are determined beforehand and stored in the cost computation unit 113. Alternatively, the operator may specify values of the weight constants each time. Alternatively, $c_1$ and so on correlate with $w_1$ and so on which are the weights of the constraint terms and, therefore, may be automatically computed from those weights.

At step S708, the overall controlling unit 112 generates an (additional) sequence list that prescribes a sequence of lots based on a result of the cost computation. Typically, this list is generated based on a solution of the first ranking. The displaying unit 111 outputs the contents of the (additional) sequence list to the image monitor or the like of the output device 102.

Alternatively, the displaying unit may display a plurality of higher ranking solutions on the image monitor of the output device 102 to prompt the operator to choose an (additional) sequence list. The generated (additional) sequence list is added to the sequence list 130 by the overall controlling unit 112.

FIG. 11 is a table chart exemplifying the sequence list 130 including an (additional) sequence list. In the sequence of No. 501 and subsequent, reordering is performed so that the work for the option C1 will be performed for one lot per three lots and the work for the option C2 will be performed for one lot per two lots.

After that, the workers 404 or robots input the lots to the production line 400 according to the sequence list, as described for FIG. 1.

According to the present example described hereinbefore, a production plan and sequence satisfying constraint conditions can be computed using an interaction model. This enables optimization of production in site.

Example 2

Even in the course of inputting lots to the production line 400 according to the sequence list 130 once generated, in some cases, the production plan and sequence may need to be changed depending on a change in the situation of the production line 400. Causes of the situation change include a shift, vacancy, or change of the workers 404 among others. Alternatively, the causes include failure of the production equipment or stop for maintenance among others.

Figure 12:
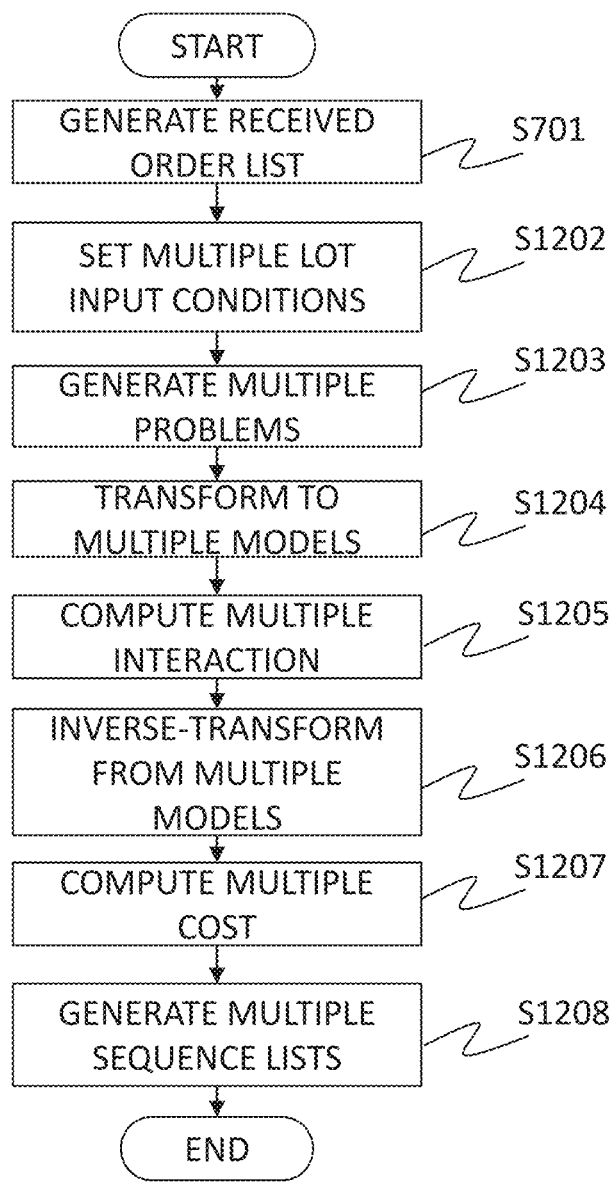
FIG. 12 is a flowchart illustrating another example of a process by the production plan proposal system 100.

FIG. 12 is a flowchart illustrating another example of a process by the production plan proposal system 100 that can respond to situation change. Explaining with the focus on difference from the example of FIG. 7, a step S1202 of setting a lot input condition is to set multiple conditions in anticipation of situation change in advance.

For example, supposing that the condition of "dealing with one lot per three lots" is set as the "constraint condition C001" in the input condition setting screen of FIG. 8, lot input conditions P001B and P001C which are constraint conditions of "dealing with one lot per four lots" and "dealing with one lot per five lots" are also created automatically as alterations to the "constraint condition C001". In subsequent steps S1203 to S1208, the process creates sequence lists L001, L001A, and L001B based on the lot input condition P001 and additional lot input conditions P001B and P001C and stores these lists as a data set in the sequence list 130.

Figure 13:
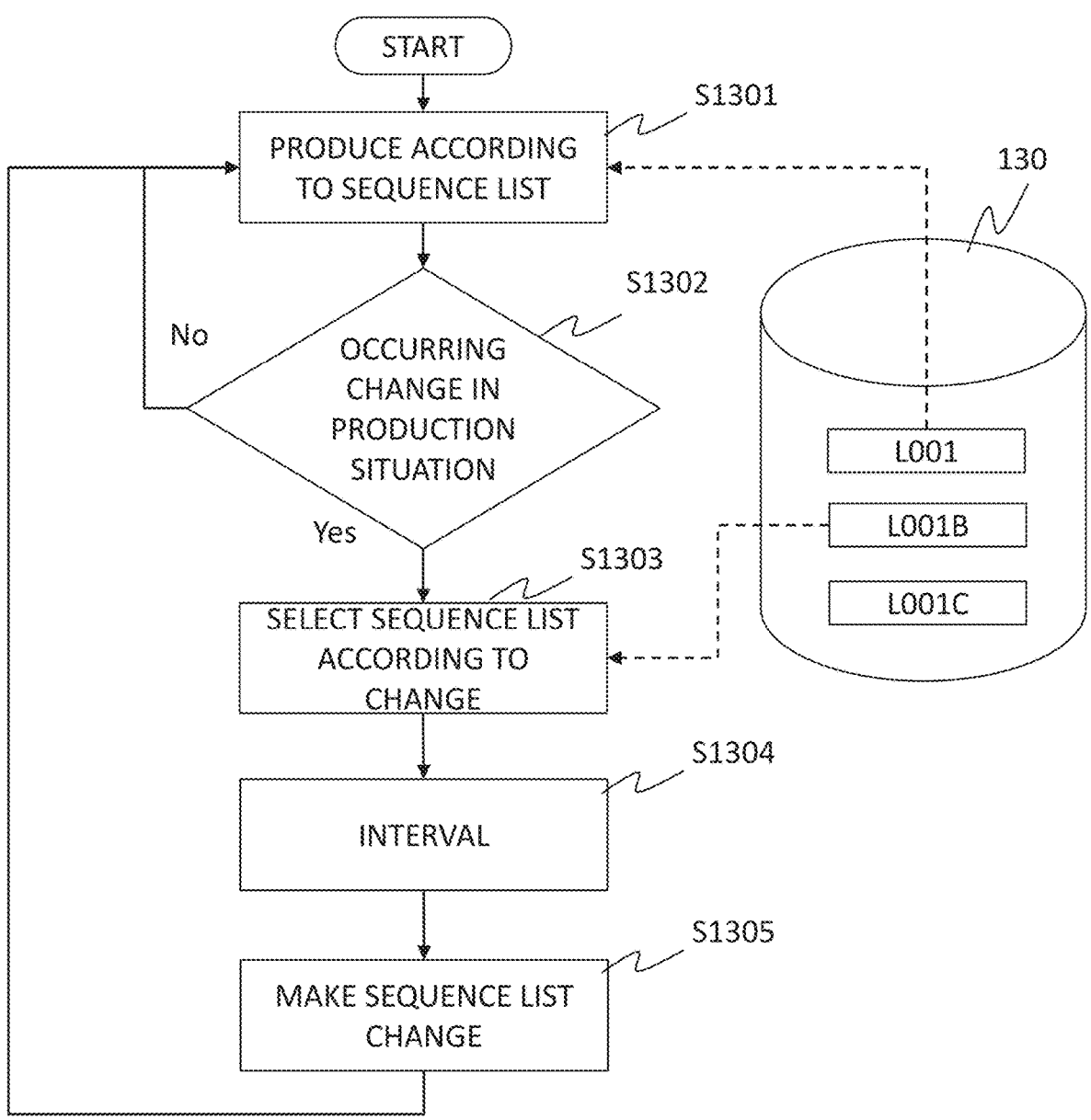
FIG. 13 is a flowchart illustrating an example of an operation flow of a production line 400.

FIG. 13 is a diagram illustrating an example of an operation flow of the production line 400 using the production plan proposal system 100 that can respond to situation change.

At step S1301, lots are input to the production line 400 according to the sequence list L001 based on the input condition P001 which is initially set by the operator.

At step S1302, the overall controlling unit 112 detects whether a change occurs in the production situation. A change in the production situation will be detected, e.g., in the case of worker vacancy by an action below: the operator inputs an occurrence of vacancy from the input device 101 of the production plan proposal system 100. Alternatively, one of the workers 404 may input an occurrence of vacancy from the input device of the production line terminal 405. Alternatively, the overall controlling unit 112 may receive data from attendance management data (not depicted) separately.

At step 1303, the overall controlling unit 112 selects a sequence list according to the change. For example, it is supposed that a lack in the number of workers engaged in a work related to the constraint condition C001 has occurred. In this case, because it is conceivable that the working time required for the work increases, the overall controlling unit will select the sequence list L001B generated based on the constraint condition of "dealing with one lot per four lots" as an alteration to the initial constraint condition of "dealing with one lot per three lots". A list change can be associated with a change in the production situation in advance so as to change the sequence list to the list L001 for absence of one worker and to the list L001C for absence of two workers.

At step S1304, when switching the lot input sequence from the sequence list L001 to the sequence list L001B, the input of lots to the production line is stopped for a predetermined interval to ensure sequence consistency before and after the switching. Alternatively, a sequence list change may be performed after waiting for predetermined timing to shift workers.

Step S1305 is to make a sequence list change and production is performed according to the sequence list after the change at step S1301.

In the present example, it is possible to change the production plan and sequence according to a change in the production situation.

Example 3

Figure 14:
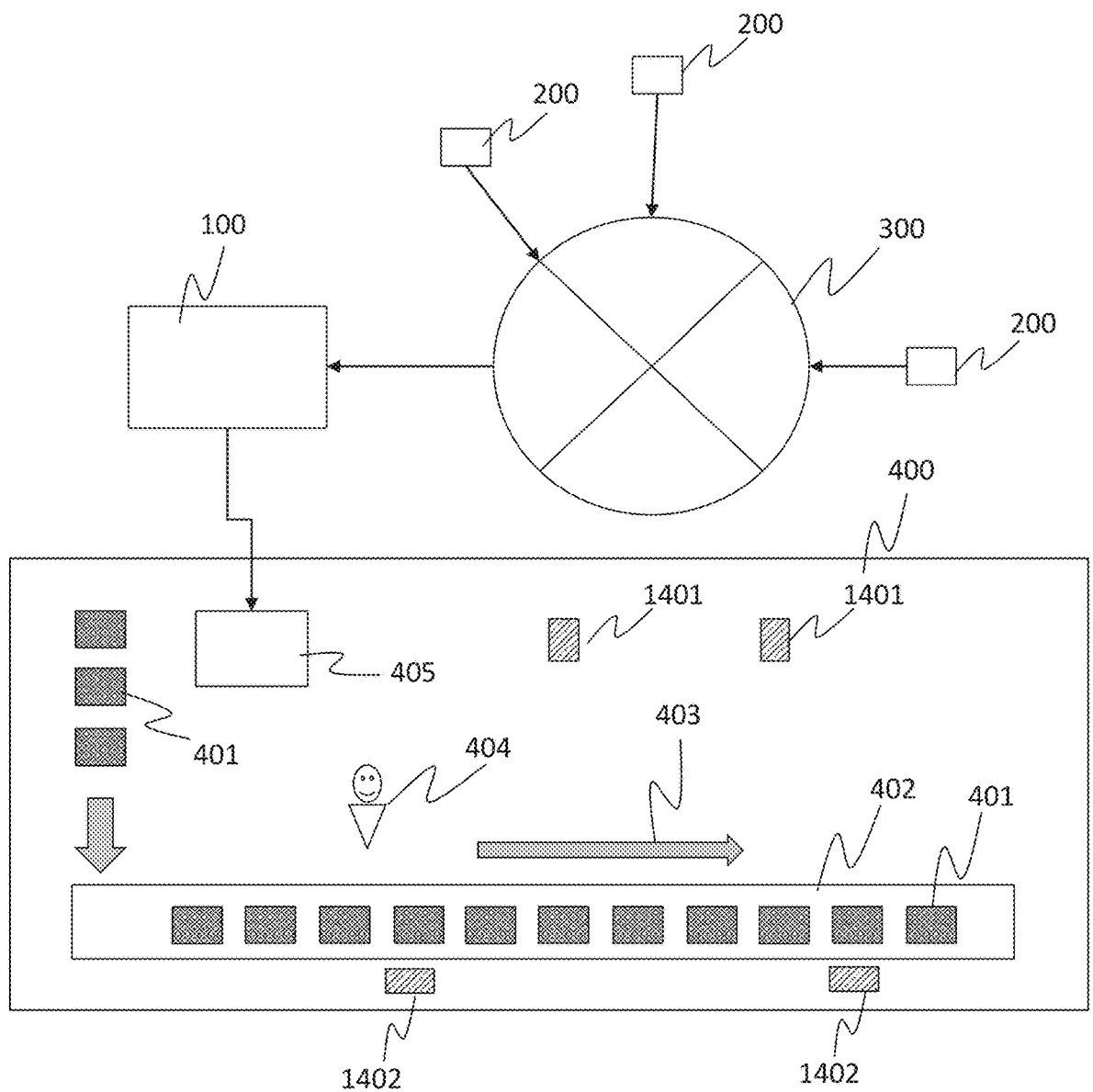
FIG. 14 is a block diagram depicting another example of operation of the production plan proposal system.

FIG. 14 is an example of automating the step S1302 of detecting whether a change occurs in the production situation in FIG. 13. Cameras 1401 and sensors 1402 are situated in the production line 400. The cameras 1401 detect, e.g., presence and absence of workers 404 and their movement and the sensors 1402 detect, e.g., speed of the belt conveyor 402 and the number of times it has stopped. Sensed information from the cameras 1401 and sensors 1042 are sent to the overall controlling unit 112 and this unit monitors a work progress quantitatively. Based on a result of the monitoring, the overall controlling unit 112 makes a decision by a predetermined algorithm or artificial intelligence and performs sequence list switching.

In the present example, it is possible to further automate the process than in Example 2.

Example 4

Examples 2 and 3 presented the examples in which a plurality of sequence lists are prepared beforehand and one of them is selected according to a change in the production situation. Example 4 presents an example in which a new sequence list is generated according to a change in the production situation.

Figure 15:
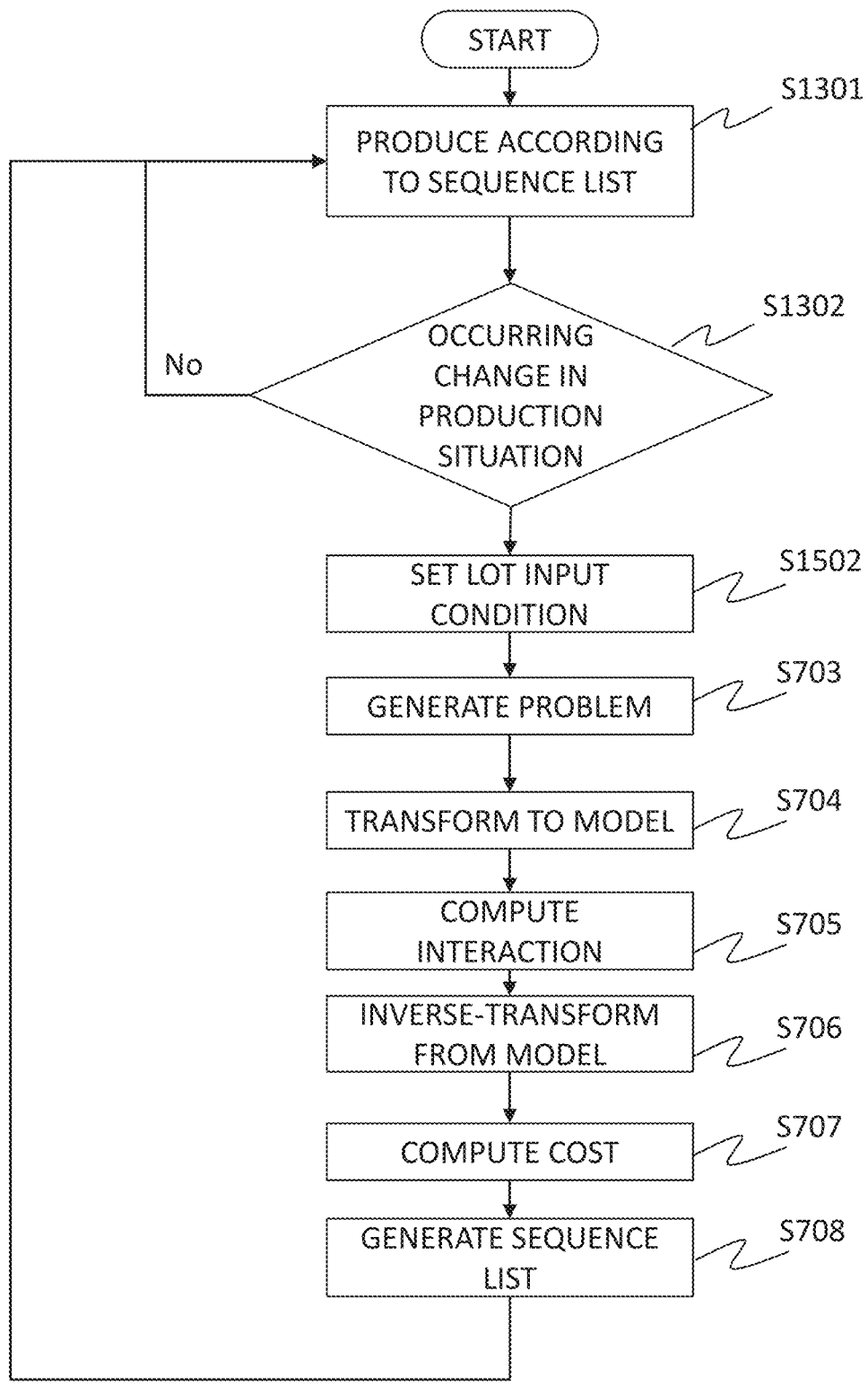
FIG. 15 is a flowchart illustrating another example of a process by the production plan proposal system 100.

FIG. 15 depicts a processing flow of Example 4 to be performed by the production plan proposal system 100. The present example is basically a combination of the processing flows of FIG. 7 and FIG. 13. By the arrangement of FIG. 15, upon detecting a change in the production situation at step S1302, the overall controlling unit 112 activates the condition setting unit 106 to propose a condition change to the operator. Alternatively, a selection may be made automatically among conditions that have been predetermined so as to respond to a change in the production situation.

FIG. 16 is a table chart exemplifying a condition change table 1600 which the overall controlling unit 112 has as internal data. In association with "sensed information" based on information from the cameras 1401 and sensors 1402 or information entered by the operator, "condition change plans" are defined in advance. Based on the condition change table 1600, the overall controlling unit 112 changes the lot input condition or proposes a change.

Figure 17:
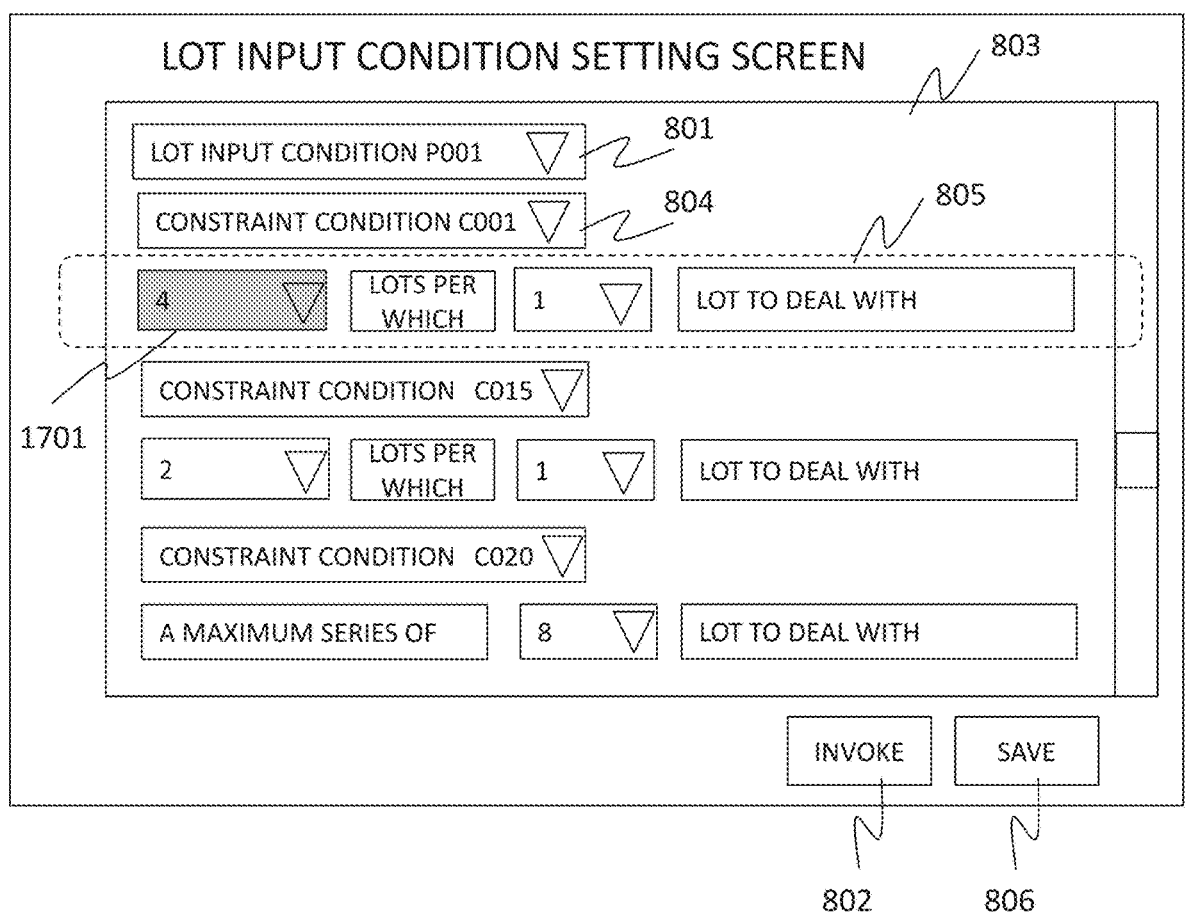
FIG. 17 is an illustrative diagram depicting an example of GUI proposing a condition change in the lot input condition setting screen.

FIG. 17 is an example of GUI of the lot input condition setting screen which the displaying unit 111 displays on the image monitor which is the output device 102 in order to acquire data to be input to the condition setting unit 106 in the step S1502 of setting a lot input condition in FIG. 15. In this example, because, for example, "absence of one worker for air-conditioner" noted in the first row of the table of FIG. 16 has been detected, a change in the number of lots of the constraint condition C001 is proposed, as highlighted 1701 by a marker. After the operator agrees to the proposal or makes a change by himself or herself and a lot input condition has been set again, a sequence list 130 according to the condition is generated through steps S703 to S708 and the step S1301 of production according to the sequence list is started. When switching between sequence lists, there will be a predetermined interval as necessary, as is the case for Example 2.

In the present example, the degree of freedom of making a sequence list change is larger than in Examples 2 and 3.

INDUSTRIAL APPLICABILITY

This disclosure relates to a technology that supports more efficient production and can be applied to particularly a technology that solves an optimization problem using an interaction model and proposes a production plan.

REFERENCE SIGNS LIST 100 production plan proposal system
101 input device
102 output device
103 processing device
104 storage device
105 annealing machine
106 condition setting unit
107 problem generation unit
108 model transformation unit
109 annealing machine controlling unit
110 inverse model transformation unit
111 displaying unit
112 overall controlling unit
113 cost computation unit
400 production line

The invention claimed is:

1. An information processing system comprising:
a vehicle production facility including:
a plurality of vehicles;
a conveyor configured to convey one or more of the plurality of vehicles; and
a production line computer having a display:
a plurality of vehicle dealer terminals coupled to a network;
a production plan computer coupled to the network and the production line computer; and
a storage device coupled to the production plan computer configured to store order numbers of vehicles and options as specifications for each vehicle to be produced,
wherein each of the vehicle dealer terminals receive inputs of the order numbers of vehicles and options for each vehicle to be produced and transmit the order numbers and the options to the production plan computer via the network to be stored in the storage device,
wherein the production plan computer is programmed to:
compute a planned sequence of the vehicles to be produced in a production process by the production facility using an interaction model, based on the options of each vehicle,
compute the interaction model in which an assignment event of a sequential position in the production process to each of the vehicles is assumed as a variable and a constraint condition regarding the production process is set as strength of an interaction between variables, and
generate a sequence list that lists assignment events of sequential positions in the production process to each of the plurality of vehicles,
wherein at least a subset of the plurality of vehicles differs in specifications to be produced by different production processes,
wherein as a constraint condition regarding the production process, the strength of an interaction between variables differs depending on at least an interval the same production processes,
wherein the storage device stores constraint condition data that prescribes at least one of frequency of occurrence and a pattern of occurrence of at least one of the different production processes as a constraint condition regarding the production process,
wherein the storage device stores lot input condition data including at least one piece or a combination of pieces of the constraint condition data, and
wherein the vehicles are introduced to the conveyor based on the sequence list that lists assignment events of sequential positions in the production process to each of the plurality of vehicles.

2. The information processing system according to claim 1 wherein the production plan computer is programmed to:
generate a problem from the received order data and the lot input condition data read from the storage device,
transform the problem to the interaction model, and
execute the interaction model to generate a result.

3. The information processing system according to claim 2, wherein the production plan computer is programmed to:
inversely transform the result of the interaction model, and
generate a sequence list that lists assignment events of sequential positions in the production process to each of the plurality of vehicles from the inversely transformed result.

4. The information processing system according to claim 3, wherein the production plan computer is programmed to:
cause the storage device to store the sequence list, and
generate a problem from the received order data and the lot input condition data read from the storage device and at least a subset of the sequence list already stored.

5. The information processing system according to claim 4 further comprising:
a display unit coupled to the production plan computer, wherein the production plan computer is programmed to:
generate or edit the lot input condition data, and
display a GUI to generate or edit the lot input condition data.

6. The information processing system according to claim 5,
wherein the production plan computer is programmed to acquire monitoring information from a production line operating based on the sequence list and changes a sequence list that should apply to the production line to another one of sequence lists already stored, based on the monitoring information.

7. The information processing system according to claim 5,
wherein the production plan computer is programmed to acquire monitoring information from a production line operating based on the sequence list,
change lot input condition data regarding the sequence list,
display a GUI to change the lot input condition data, and
compute the interaction model based on the changed lot input condition data.

8. The information processing system according to claim 6,
wherein the production plan computer is programmed to:
determine condition change plans in association with the monitoring information, and
change the display based on one of the condition change plans when displaying a GUI to change the lot input condition data.

9. An information processing method using an information processing system including an administrative device and a computational device, the administrative device inputting an interaction model to the computational device and causing the computational device to execute computation,
wherein the information processing method performs:
a first step in which the administrative device acquires a received order list including received order data about specifications on each of a plurality of vehicles to be produced;
a second step in which the administrative device acquires constraint conditions regarding production processes required to meet the specifications on each of the plurality of vehicles to be produced;
a third step in which the administrative device generates the interaction model based on the received order list and the constraint conditions;
a fourth step in which the administrative device inputs the interaction model to the computational device;
a fifth step in which the computational device executes a ground state search on the interaction model;
a sixth step in which the administrative device reads a result of computation executed by the computational device; and
a seventh step in which the administrative device generates a sequence list prescribing assignment events of sequential positions in the production processes to each of the plurality of vehicles things, based on the result of computation,
wherein at least a subset of the plurality of vehicles differs in specifications to be produced by different production processes,
wherein as a constraint condition regarding the production process, the strength of an interaction between variables differs depending on at least an interval the same production processes,
wherein constraint condition data is stored that prescribes at least one of frequency of occurrence and a pattern of occurrence of at least one of the different production processes as a constraint condition regarding the production process,
wherein lot input condition data is stored including at least one piece or a combination of pieces of the constraint condition data, and
wherein the vehicles are introduced to the conveyor based on the sequence list that lists assignment events of sequential positions in the production process to each of the plurality of vehicles.

* * * * *